March 15, 1932. K. H. HUBBARD 1,849,761
REGULATOR
Filed Nov. 5, 1930 2 Sheets-Sheet 1

INVENTOR:
Karl H. Hubbard
BY
Alfred Berger
ATTORNEY

March 15, 1932.  K. H. HUBBARD  1,849,761
REGULATOR
Filed Nov. 5, 1930  2 Sheets-Sheet 2

INVENTOR:
Karl H. Hubbard
BY
Alfred Burger
ATTORNEY

Patented Mar. 15, 1932

1,849,761

UNITED STATES PATENT OFFICE

KARL H. HUBBARD, OF ROCHESTER, NEW YORK, ASSIGNOR TO TAYLOR INSTRUMENT COMPANIES, OF ROCHESTER, NEW YORK, A CORPORATION OF NEW YORK

REGULATOR

Application filed November 5, 1930. Serial No. 493,567.

This invention relates to air-operated regulators.

Air is extensively used as an actuating medium for the operation of valves, particularly in connection with the control of temperature and pressure conditions. In most regulators of the type involved, a primary element such as a Bourdon coil or a pressure responsive diaphragm is capable of supplying only very little energy, but it is made to control the output of a valve or valves regulating a stream or streams of compressed air or other pressure-fluid, which output is sufficiently large so that various motor devices may be actuated by it.

It is the general object of the invention to materially increase the sensitivity of response, the reliability of performance and the capacity of air-operated regulators.

My invention may be briefly described as a feed-back or regenerative system, similar in principle to regeneration used in vacuum tube amplification.

For a full understanding of the invention, its principle of operation and its advantages, reference is made to the accompanying drawings, wherein Fig. 1 is an elevational, partly diagrammatic representation of an embodiment of the invention;

Figure 1:
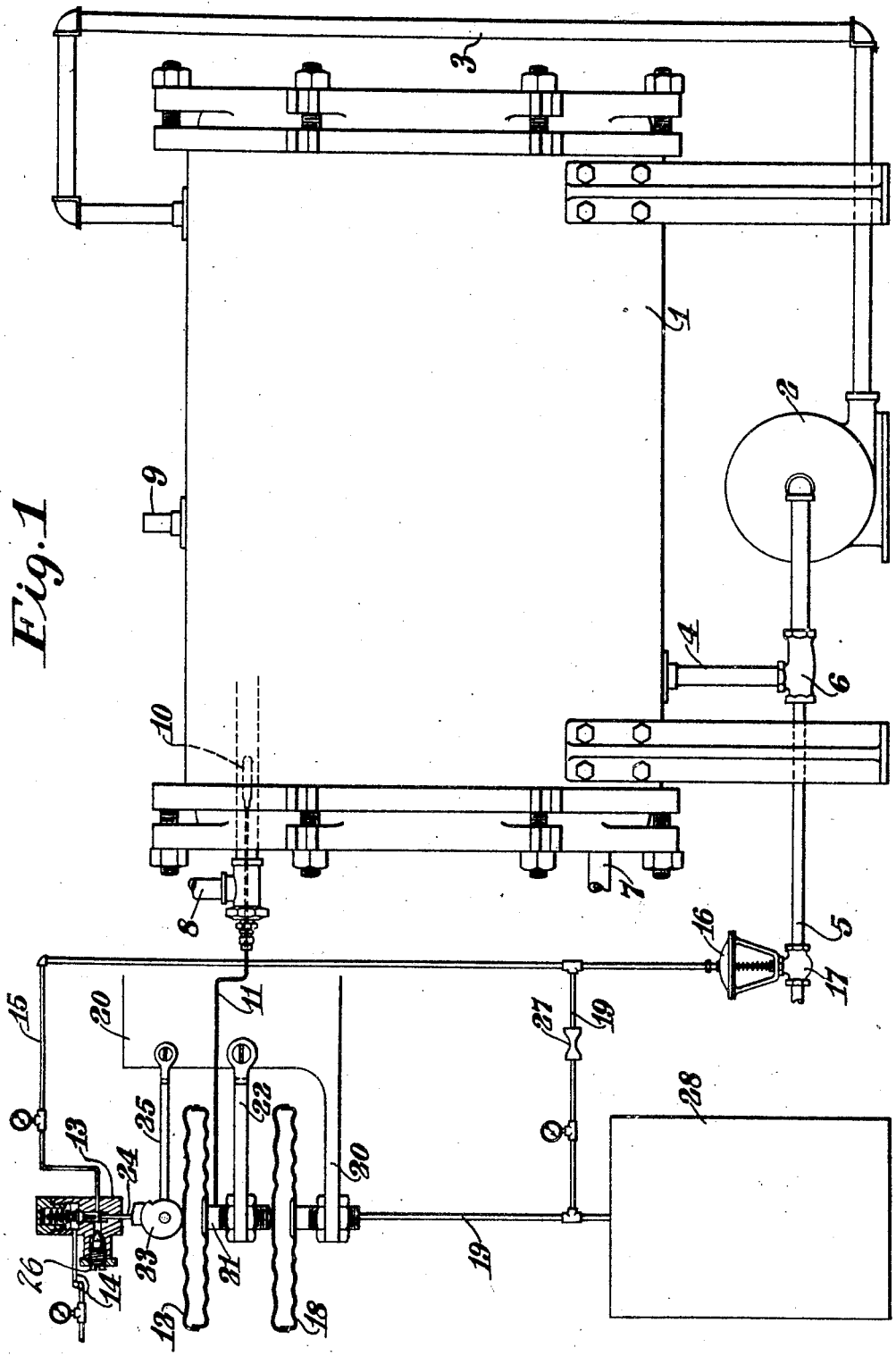

Having reference to Fig. 1, the invention is shown as applied to the control of a continuous flow milk heater, comprising the barrel heater 1, a steam heating system including the circulating pump 2, heater intake pipe 3, outlet 4, steam supply pipe 5 and mixing chamber 6, and a milk conduit including the intake pipe 7 and discharge pipe 8, the milk passing through a coil (not shown) in the barrel in heat exchange relation to the hot water in the heater. An overflow 9 is provided for the excess condensate.

The arrangement just described does not form any part of the invention and has been referred to merely to show one concrete application of the invention.

In the discharge end of the milk coil is mounted a thermometer bulb 10 which is the temperature-responsive member of an apparatus for controlling the temperature in the heater. The bulb 10 is connected by means of the usual capillary 11 to a pressure-responsive diaphragm 12 which, in turn, by its varying expansion and contraction operates the pilot valve 13. The pilot valve 13 regulates the flow of compressed air from supply pipe 14 to the conduit 15 leading to the diaphragm top 16 of the valve 17 which controls the flow of steam to the heater.

The control arrangement thus far described generally represents a usual form of apparatus. As the temperature in the discharged milk varies, the pressure variations in the expansible medium in the bulb are transmitted to the diaphragm and from the latter to the pilot valve and due to the resulting changes in the position of the valve 13 and the top 16, the position of the valve 17 is varied accordingly to admit more steam when the temperature in the heater 1 falls and to decrease the steam intake when the temperature rises above a definite temperature for which the instrument is set. An increase of pressure at the top 16 causes a movement of the valve 17 toward closing and vice versa.

The invention contemplates an auxiliary diaphragm 18 in fluid connection with the conduit 15 by means of a branch conduit 19. The diaphragm 18 is mounted on a stationary support 20 while the diaphragm 12 is mounted to be supported by the diaphragm 18. A stud 21 which at its lower end rests upon diaphragm 18 is held in position by an arm 22 pivotally supported on stationary support 20. Similarly the adjustable cam 23 by which the motion of diaphragm 12 is transmitted to the stem 24 of valve 13, is held in place by an arm 25 likewise pivotally mounted on support 20.

Thus the combined movement of diaphragms 12 and 18 is transmitted to the valve 13. When due to a slight rise of the temperature in the heater 1, the diaphragm 12 slightly lifts the valve stem 24, the increase of pressure in the conduit 15 causes a pressure reaction upon diaphragm 18 with the result that the expansion of the diaphragm 18 causes an augmental rise of the stem 24 and a further increase of pressure in the conduit 15 until finally an equilibrium is reached between the pressure in the conduit and the diaphragm 18.

The operation of the device described is affected by various factors. One principal factor is the strength of the diaphragm 18. Another factor is the size of the leak 26 from the passage in the valve 13 to the outside. The greater the leak, the smaller the pressure reaction upon diaphragm 18 and the smaller the leak the greater the pressure reaction upon diaphragm 18. In fact, in the absence of a leak or if the leak were too small, the pressure in conduit 15 would never be at an intermediate value, but would be either one extreme or the other.

By making the leak adjustable as shown, any desired balance may be established between the diaphragm 18 and the pressure variations at the outlet of valve 13 or in the conduit 15.

Thus the control is made very sensitive. The slightest temperature change in the barrel heater 1 will cause a large movement of stem 24 of valve 13 and a correspondingly large regulating action of valve 13 and valve 17. This makes possible a greater response of the regulator for a given small temperature change.

The action of the diaphragm 18, i. e. its rate of response may be varied and adjusted in several ways. A constrictive orifice 27 and a reservoir 28 may be used independently or concurrently for determining the rate of response. The greater the reservoir capacity or the smaller the orifice constriction, the more pronounced is the delay in the action of the diaphragm 18, i. e. the longer it will take for the diaphragm 18 to reach its final position and the longer it will take for the pressure in the conduit 15 and at the diaphragm top to reach its final regulating position. The use of the orifice 27 or of the reservoir 28 or preferably of both, although not strictly necessary to carry out the object of the invention, are practically desirable in order to prevent hunting or instability of the regulator and to allow the temperature in the heater 1 or in general the conditions to be controlled to more gradually change in the required direction.

The sole purpose of any regulating system is to bring the conditions to be controlled back to normal as speedily as possible. This requires a maximum of sensitivity and a maximum of available regulating action. Maximum sensitivity and maximum regulating action, on the other hand, are bound to cause overshooting above and below the control point. By my arrangement I obtain a maximum of sensitivity and available regulating action, but I also provide a means for adjusting the regulating action to suit any set of given factors so as to avoid undue fluctuations above and below the regulating point.

Figure 2:
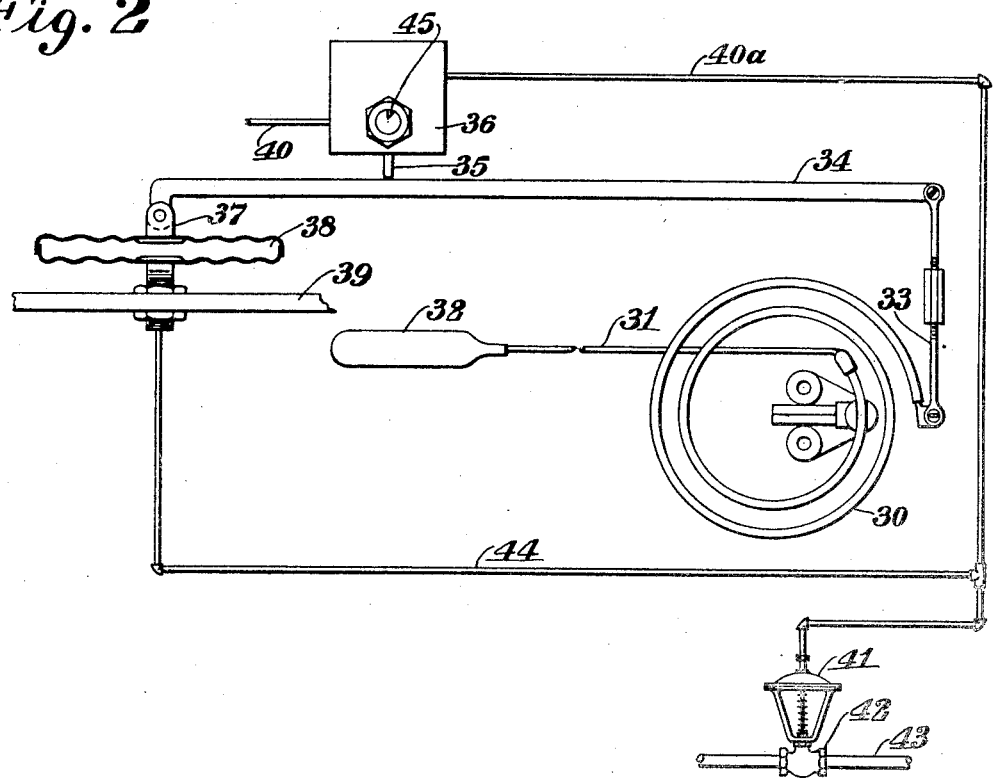
Fig. 2 is a diagrammatic view of another embodiment.

Having now reference to Fig. 2, 30 represents a Bourdon tube connected by means of a capillary 31 to a bulb 32. The free or active end of the tube 30 is connected by means of an adjustable link 33 with one end of a lever 34 operatively associated with the stem 35 of a pilot valve unit 36 of usual construction. In the particular instance, the other end of the lever 34 is pivotally connected with a stud 37 mounted on a diaphragm 38 which is adjustably mounted on a support 39. Valve unit 36 controls a conduit 40 leading from a source of compressed air (not shown) or other pressure fluid through the conduit 40a to the diaphragm top 41 of a valve 42 controlling a line 43 of steam or other medium for the regulation of a condition. A connection 44 leads from the conduit 40a to the diaphragm 38.

When due to an increase in the temperature at the bulb 32, the free end of the tube 30 slightly moves and thereby lifts the link 33, the lever 34 and the stem 35, the corresponding increase of pressure at the outlet end of the valve 36 and in the conduit 40a reacts upon the diaphragm 38 whereby the lever 34 is lifted about its opposite end where it is pivotally connected to the link 33. This lifting again will increase the valve opening and the pressure at the outlet side therewith the result that the diaphragm 38 will further expand until finally a balance is reached in dependence of the adjustment of the leak 45.

Although the arrangement may be applied as indicated, for regulating purposes, it is primarily an amplifying system for small pressure changes in the Bourdon spring or for increasing the small force available from the spring for the operation of any device. Irrespective of the ultimate purpose of the instrument, instead of small pressure changes at the outlet end of the valve 36, the regenerative diaphragm 38 causes a change of pressure greatly in excess of the change which would be normally effected by the Bourdon spring alone.

Figure 3:
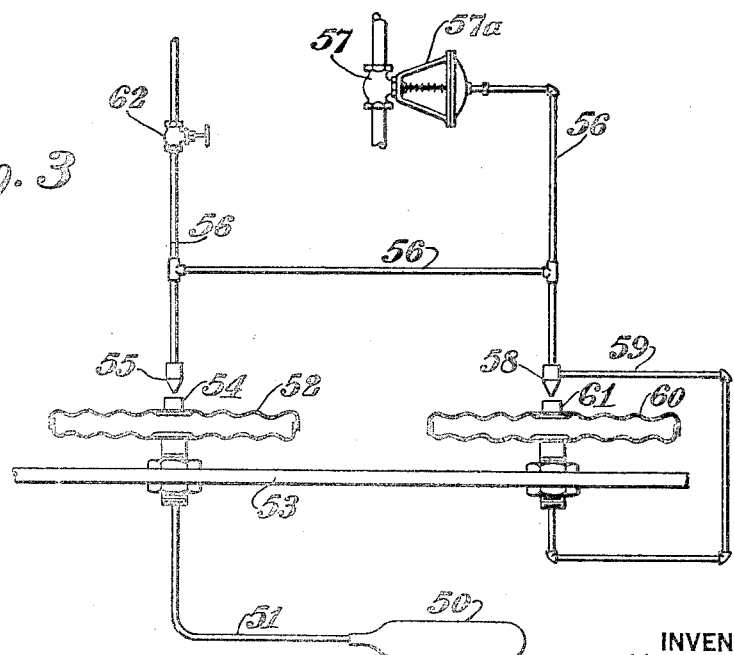
Fig. 3 is a similar view of still another form of the invention.

In Fig. 3, the bulb 50 is connected by means of a capillary 51 to the diaphragm 52 which is supported on a support 53 and carries on its upper face a small stud 54 cooperating with the orifice of a jet 55 of a pressure fluid conduit 56 connected with the diaphragm top 57a of a control valve 57 which may be assumed to serve the same purpose as the valve 17 in Fig. 1.

The conduit 56 includes a second jet 58 and also is connected by means of a branch conduit 59 with a second diaphragm 60 the upper surface of which through a small stud 61 cooperates with the orifice of jet 58.

Air flows through the conduit 56 to the diaphragm top 57a and the pressure at the top depends upon the amuont of leakage through the jets 55 and 58. Assume the jet orifices to be in definite positions relatively to the opposing surfaces of studs 54 and 61 and that the temperature at the bulb 50 slightly increases. This increase of the temperature causes a corresponding rise of the stud 54 thus causing a slight decrease in the rate of the leak through the orifice of the jet 55. This decrease in the rate of the leak, in turn causes a slight rise of the pressure in the conduit 56. This rise of pressure, again, reacts upon the diaphragm 60 causing a decrease in the rate of leak at the jet 58 with the result that the pressure in the conduit 56 is further increased until finally a balance is established between the pressure in the conduit and the diaphragm 60. Naturally, the point where this balance is reached depends largely upon the characteristics of the diaphragm 60 and upon the size of the orifice 58, but in addition, in order to easily adjust the system in that respect, I provide an adjustable orifice 62 whereby the change in the rate of flow through the orifice 62 and its relation to the rate of leak through the orifices of the jets 55 and 58 may be so adjusted as to bring about the desired performance of the diaphragm 60.

In the foregoing I have described several forms in which the invention may find expression. While I have made a special reference to temperature control, the invention is clearly applicable to broader uses and is intended generally for all indicating, regulating and recording apparatus wherein a pressure-responsive element such as a Bourdon spring or a diaphragm is the primary element responsive to the conditions to be observed, regulated or recorded and more in particular wherein a stream of pressure fluid is controlled by the said primary element for the operation of regulating apparatus.

I claim:

1. In apparatus of the character described, an element sensitive to conditions to be controlled, a pressure-fluid conduit, means for varying the pressure in said conduit by the action of said sensitive element and means responsive to the variations of pressure in the conduit due to the action of said means for regeneratively amplifying the variations of pressure.

2. In apparatus of the character described, an element sensitive to conditions to be controlled, a pressure fluid conduit, means for regulating the flow of fluid through the conduit by the action of the said sensitive element to produce changes of pressure, and means responsive to changes of pressure in the conduit due to the said regulating action for amplifying the variations of pressure in proportion to the magnitude thereof.

3. In apparatus of the character described, an element sensitive to conditions to be controlled, a pressure-fluid conduit, a valve controlling the conduit, means for transmitting movement of the said element to the valve for the operation thereof, and means responsive to pressure changes at the outlet side of the valve for cooperation with the said transmitting means to amplify the action of the latter upon the valve.

4. In apparatus of the character described, a pressure fluid conduit and a motor connected thereto to be operated by the pressure fluid, means sensitive to conditions to be controlled, for regulating the flow of the fluid in the conduit, and means responsive to the action of said means for regeneratively amplifying the effect thereof.

5. In apparatus of the character described, a pressure fluid conduit and a motor connected thereto to be operated by the pressure fluid, means sensitive to conditions to be controlled for regulating the flow of the fluid in the conduit, and means responsive to the regulating effect produced by said means for regeneratively increasing the regulating action thereof.

6. In apparatus of the character described, a pressure fluid conduit and a motor connected thereto to be actuated by the pressure fluid, means sensitive to conditions to be controlled for regulating the pressure of the fluid at the motor end of the conduit, and means responsive to the pressure changes induced by the said sensitive means for regeneratively amplifying the said pressure changes.

7. In apparatus of the character described, a pressure fluid conduit and a motor connected thereto to be actuated by the pressure fluid, means sensitive to conditions to be controlled for regulating the pressure of the fluid at the motor end of the conduit, and mechanism for amplifying the regulating effect produced by said sensitive means, including means responsive to pressure changes at the motor end of the conduit and means for causing said responsive means to induce a pressure-regulating effect additive to the regulating effect produced by the said sensitive means.

8. In apparatus of the character described, a pressure fluid conduit and a motor connected thereto to be actuated by the pressure fluid, valve mechanism for varying the pressure at the motor end of the conduit, means sensitive to conditions to be controlled for acting upon the valve mechanism, and means responsive to pressure changes induced by the sensitive means for acting upon the valve mechanism to regeneratively amplify the pressure changes.

9. In apparatus of the character described, a pressure fluid conduit and a motor connected thereto to be actuated by the pressure fluid, means sensitive to conditions to be controlled for regulating the pressure of the fluid at the motor end of the conduit, and means responsive to pressure changes induced by the said sensitive means for acting upon the latter to regeneratively amplify the regulating effect thereof.

10. In apparatus of the character described, the combination with an element sensitive to conditions to be controlled, a pressure fluid conduit, means for varying the pressure in the conduit by the action of said sensitive element and means responsive to the variations of pressure in the conduit due to the action of said means for amplifying the variations of pressure, including a capsular diaphragm in fluid connection with the zone of pressure in the conduit and means for causing the capsular diaphragm to amplify the variations of pressure produced by the sensitive element in proportion to the magnitude of the variations.

11. In apparatus of the character described, the combination with an element sensitive to conditions to be controlled, a pressure fluid conduit, means for varying the pressure in the conduit by the action of said sensitive element, and means responsive to the variations of pressure in the conduit due to the action of said means for amplifying the variations of pressure, including a capsular diaphragm in fluid connection with the zone of pressure in the conduit, means for causing the capsular diaphragm to amplify the variations of pressure produced by the sensitive element in proportion to the magnitude of the variations and means for adjusting the amplifying action of the diaphragm.

12. In apparatus of the character described, the combination with an element sensitive to conditions to be controlled, a pressure fluid conduit, means for varying the pressure in the conduit by the action of said sensitive element and means responsive to the variations of pressure in the conduit due to the action of said means for amplifying the variations of pressure, including a capsular diaphragm in fluid connection with the zone of pressure in the conduit, means for causing the capsular diaphragm to amplify the variations of pressure produced by the sensitive element in proportion to the magnitude of the variations and means providing an adjustable leak from the zone of pressure variations in the conduit.

13. In apparatus of the character described, the combination with an element sensitive to conditions to be controlled, a pressure-fluid conduit, a valve in said conduit, a pressure-responsive device cooperating with said valve for causing same to vary the pressure in the conduit, means including said sensitive element for actuating said pressure-responsive device, a second pressure-responsive device serving when actuated to operate said first device, and a connection from said conduit to said second device whereby the same is responsive to changes in pressure due to the operation of said valve.

In testimony whereof I affix my signature.

KARL H. HUBBARD